July 16, 1940.  J. T. DALTON  2,207,912
ATTACHMENT FOR STAPLING MACHINES
Filed Oct. 14, 1938  11 Sheets-Sheet 1

Inventor
John Thomas Dalton
By Pennie, Davis, Marvin & Edmonds
Attorneys

July 16, 1940.  J. T. DALTON  2,207,912
ATTACHMENT FOR STAPLING MACHINES
Filed Oct. 14, 1938  11 Sheets-Sheet 2
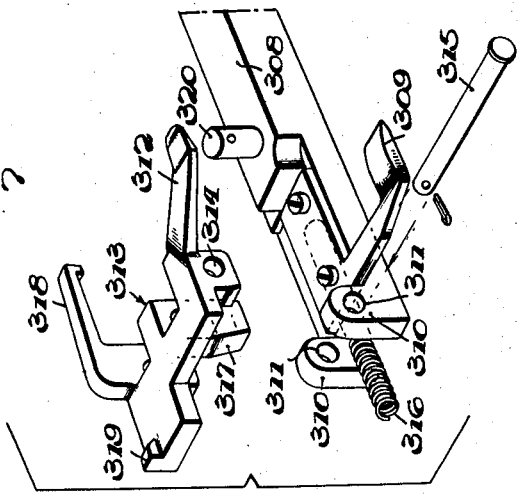
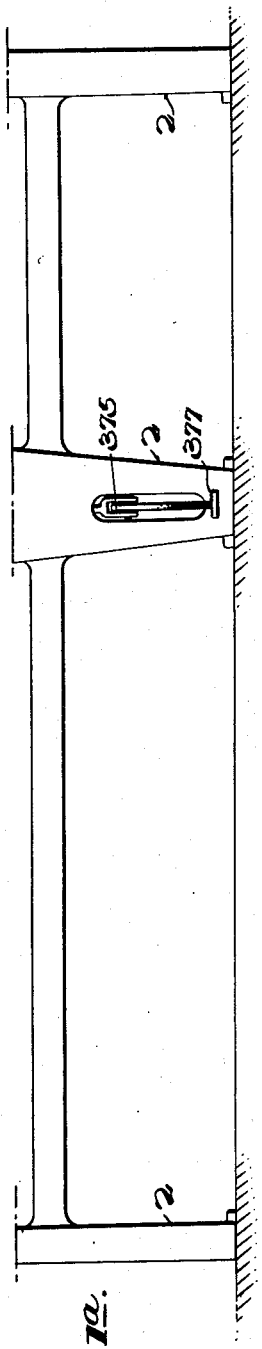
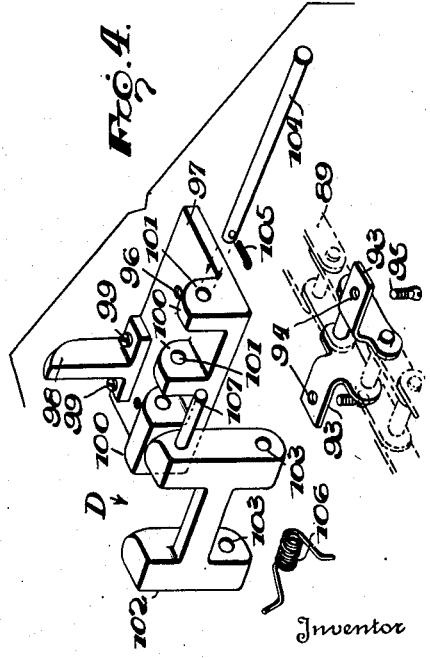
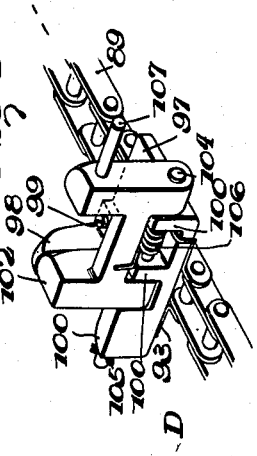
Inventor
John Thomas Dalton.
By Pennie, Davis, Marvin & Edmonds.
Attorneys July 16, 1940.    J. T. DALTON    2,207,912
ATTACHMENT FOR STAPLING MACHINES
Filed Oct. 14, 1938    11 Sheets-Sheet 4
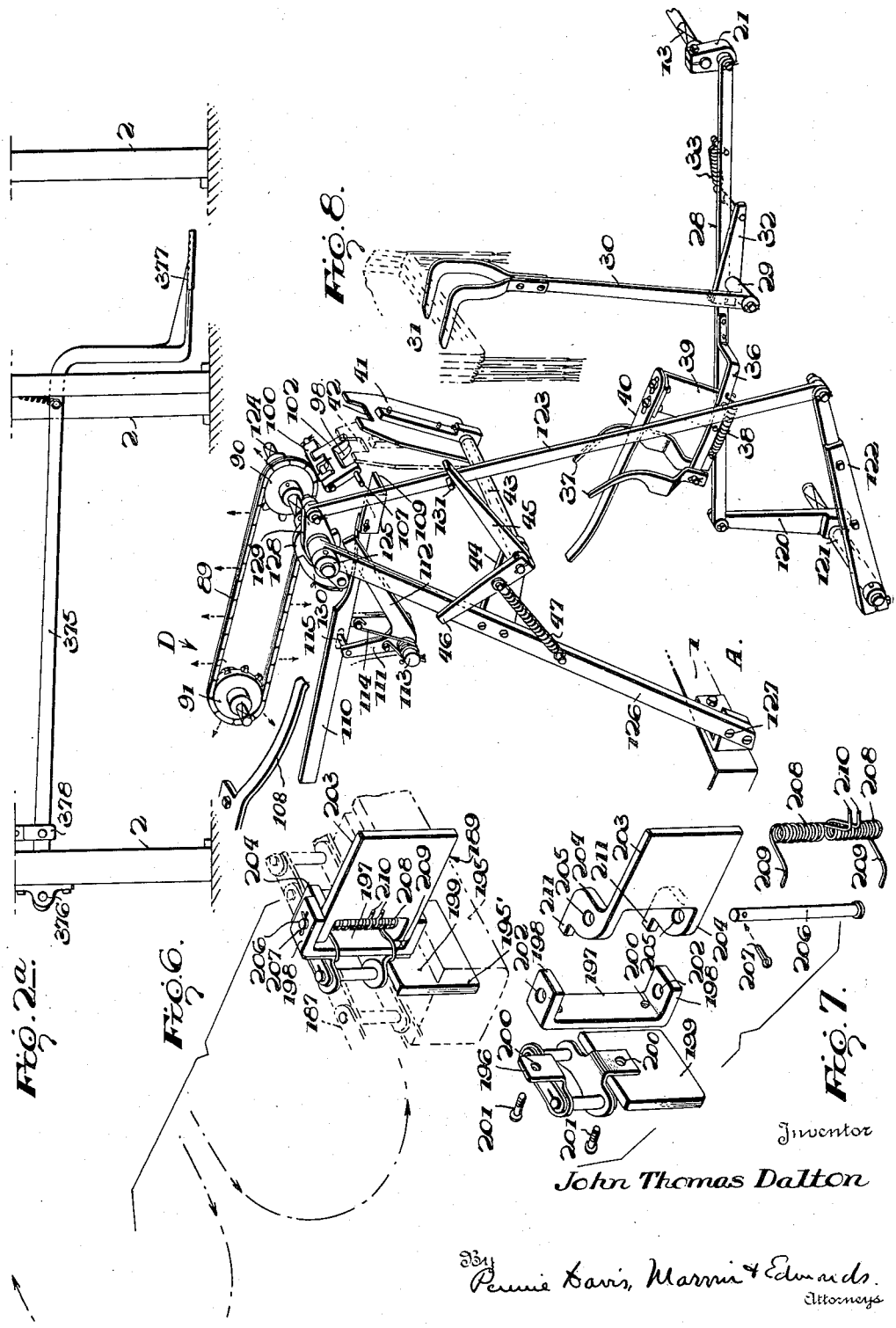
Inventor
John Thomas Dalton
By Pennie Davis, Marvin & Edwards
Attorneys July 16, 1940.  J. T. DALTON  2,207,912
ATTACHMENT FOR STAPLING MACHINES
Filed Oct. 14, 1938  11 Sheets-Sheet 5
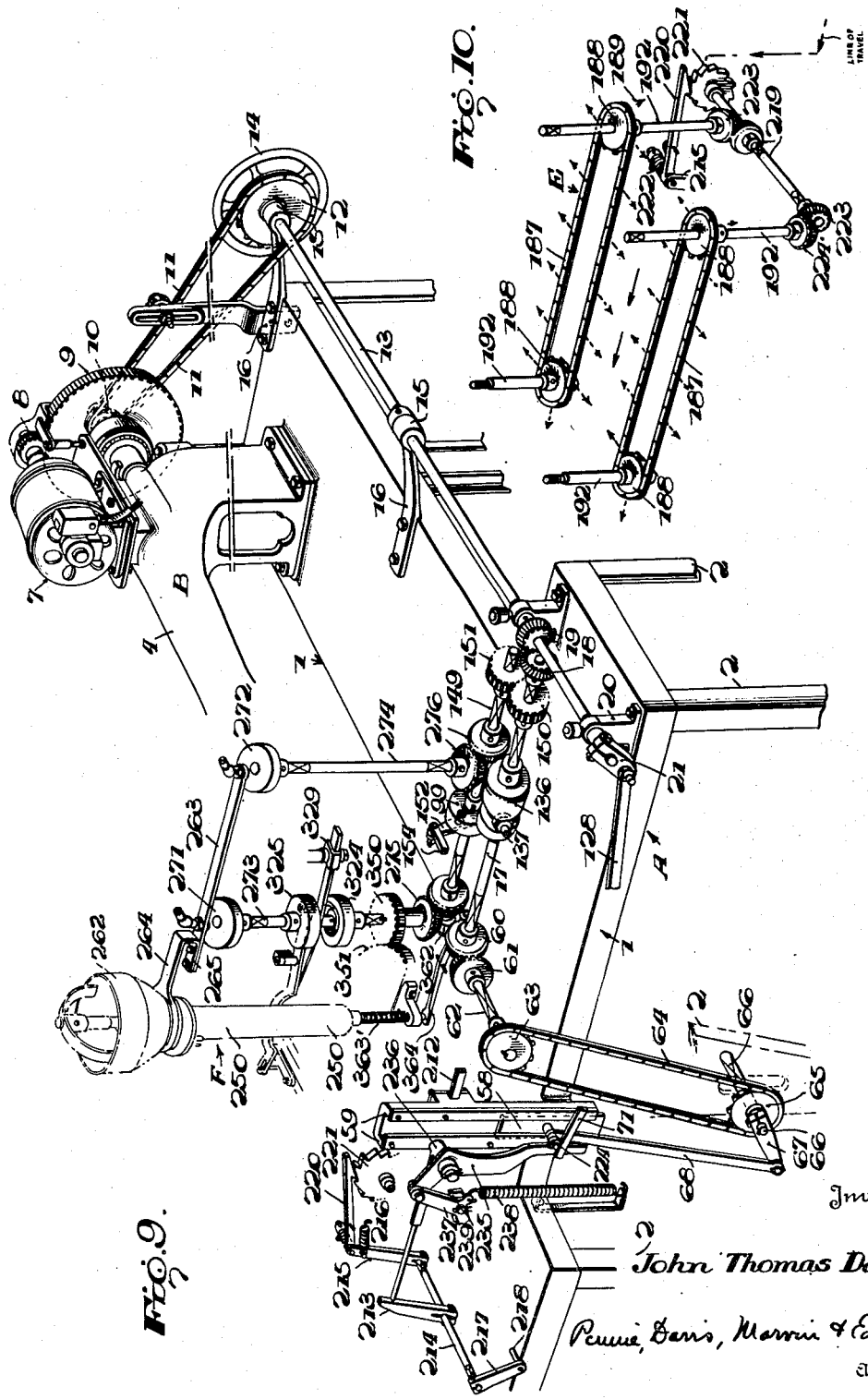

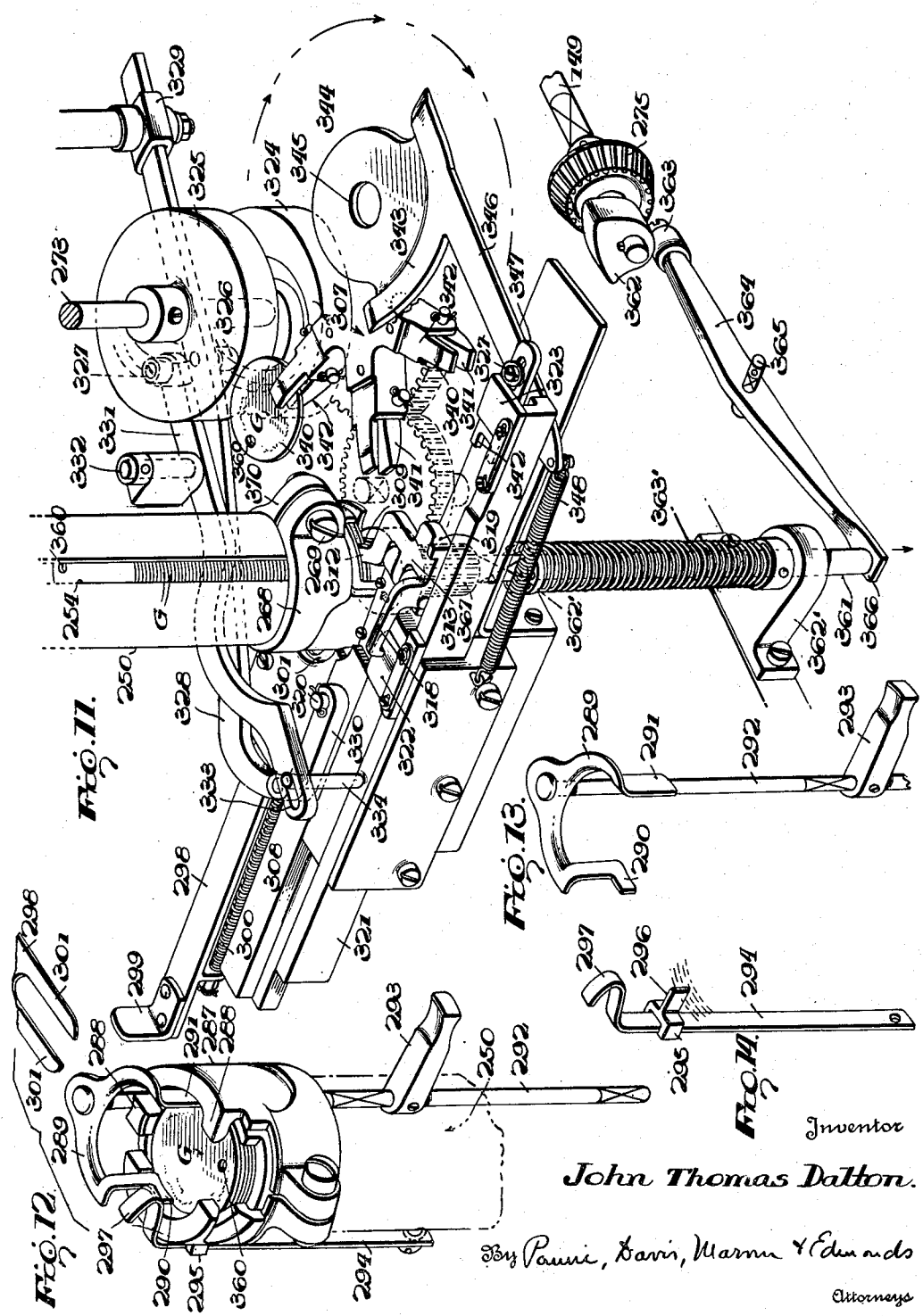

July 16, 1940.   J. T. DALTON   2,207,912
ATTACHMENT FOR STAPLING MACHINES
Filed Oct. 14, 1938   11 Sheets-Sheet 7
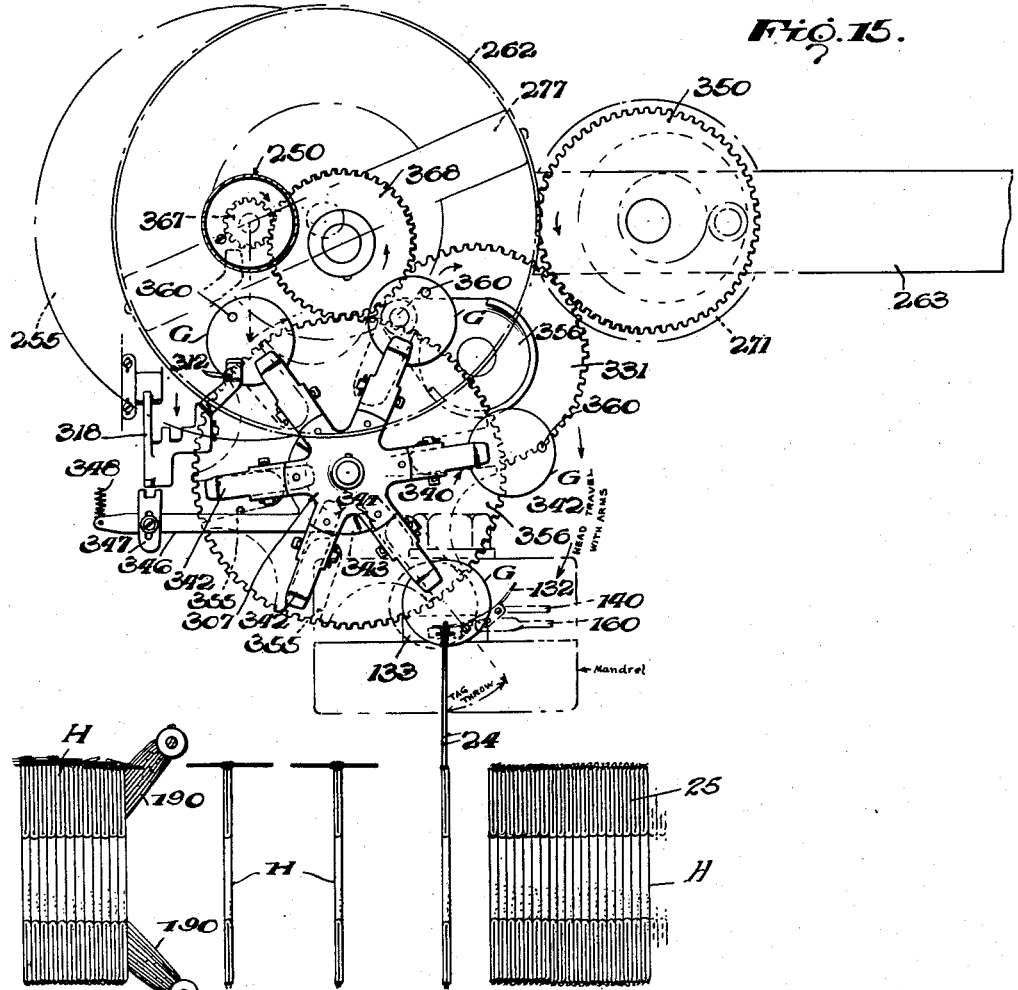
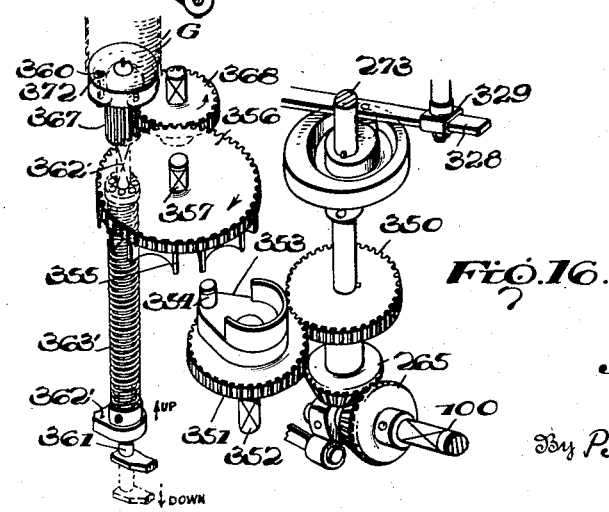
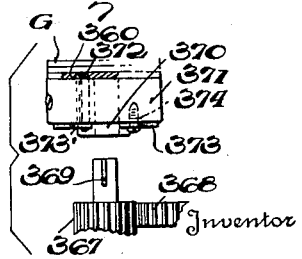
Inventor
John Thomas Dalton
By Pennie, Davis, Marvin & Edmonds
Attorneys

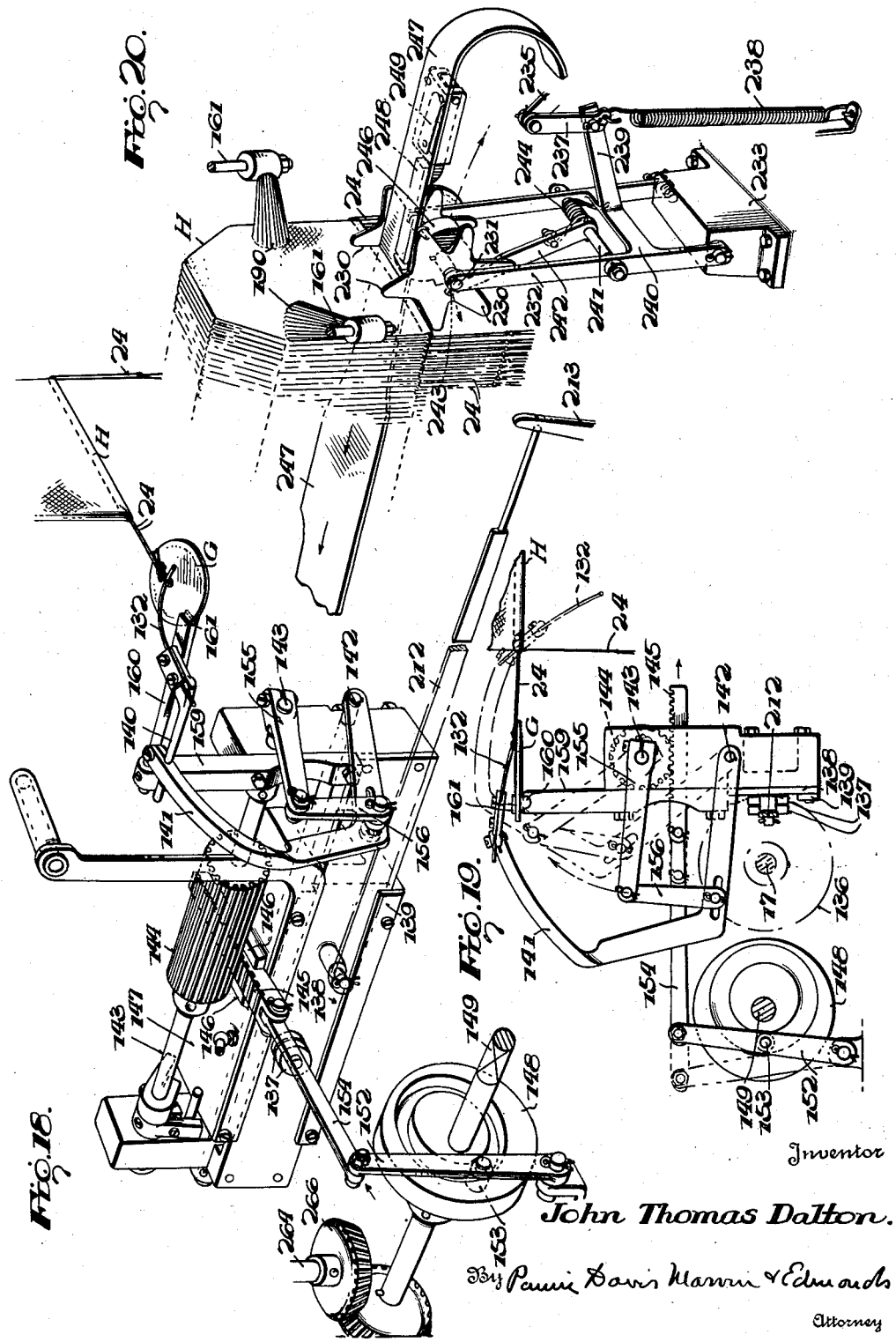

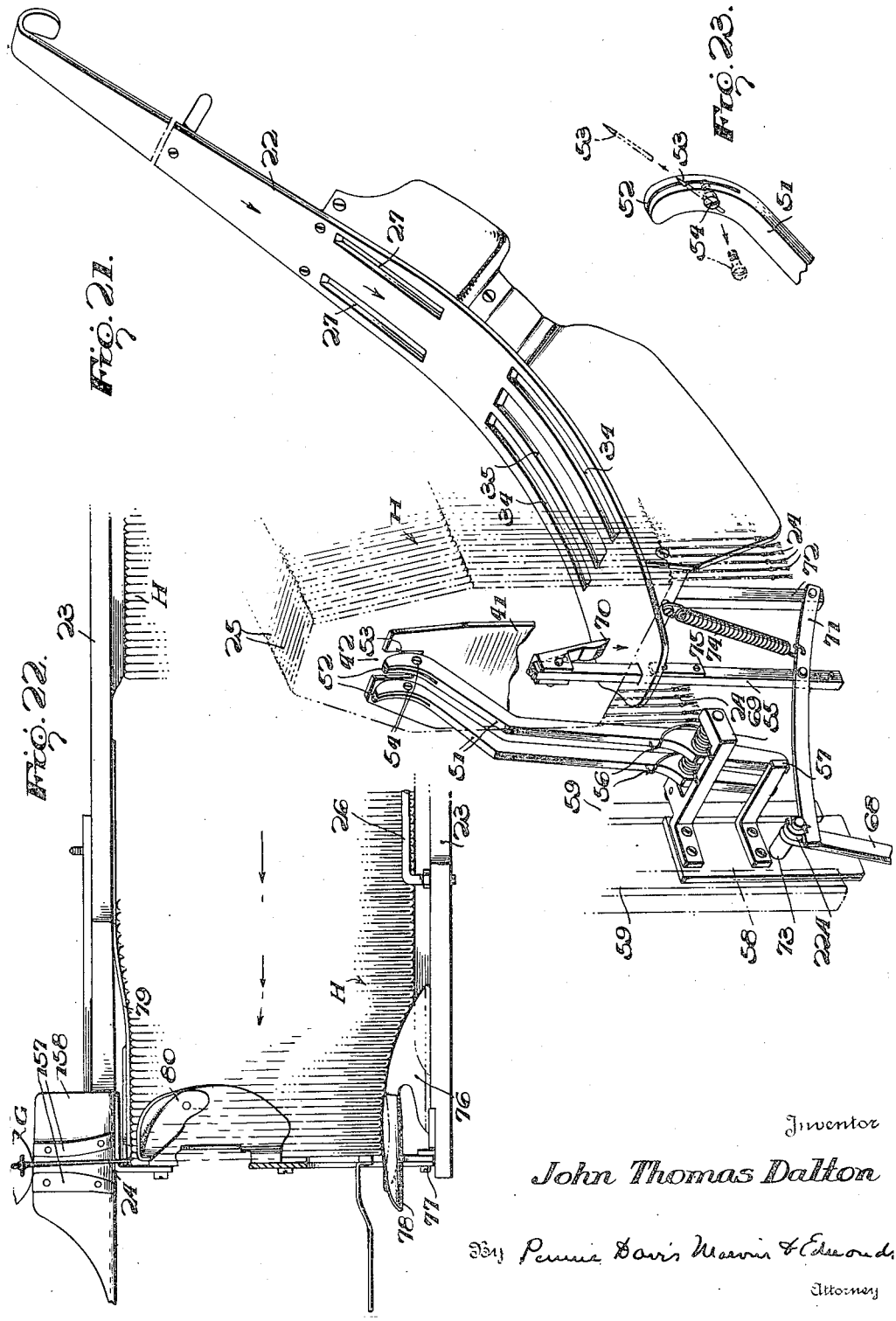

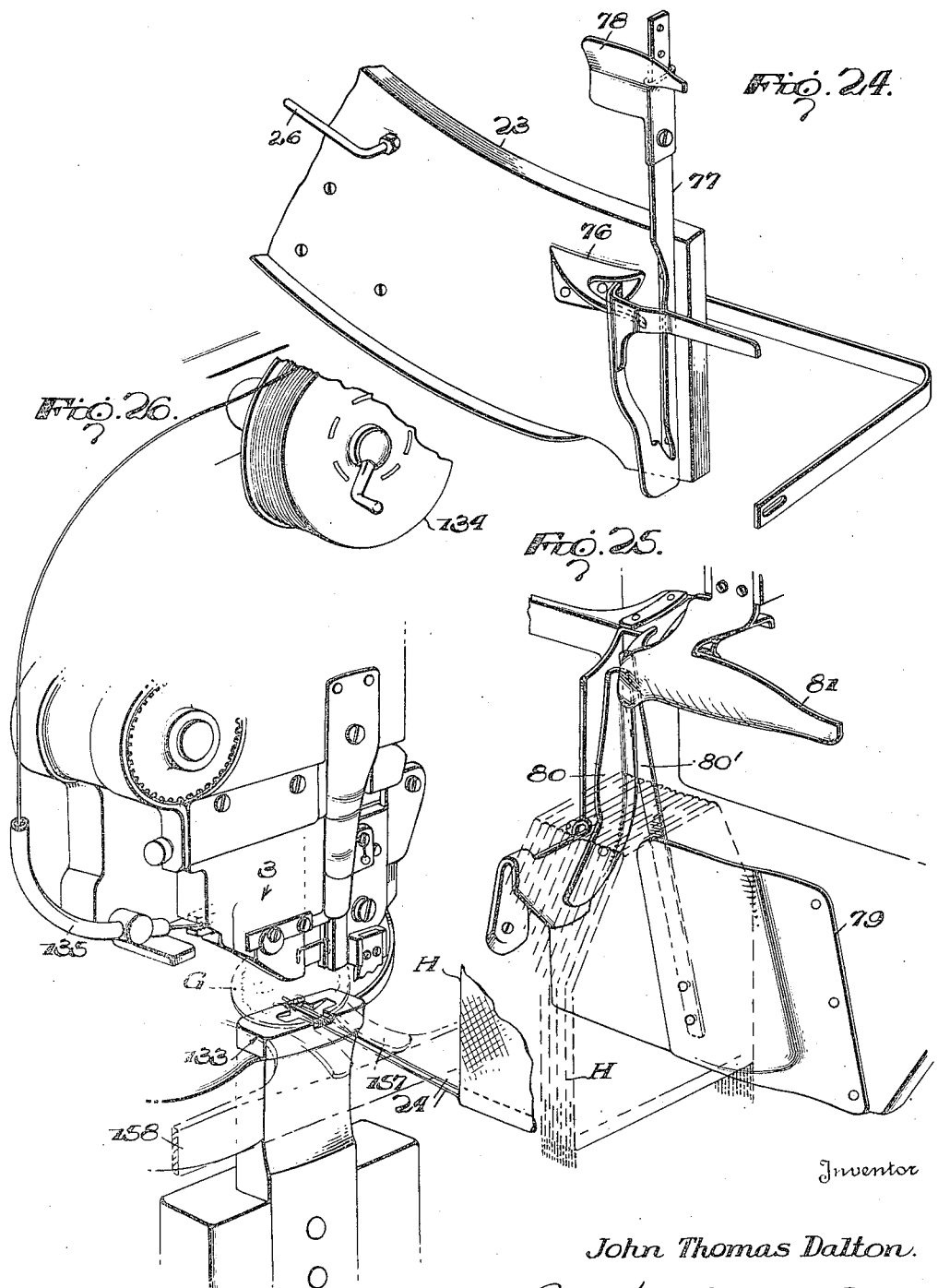

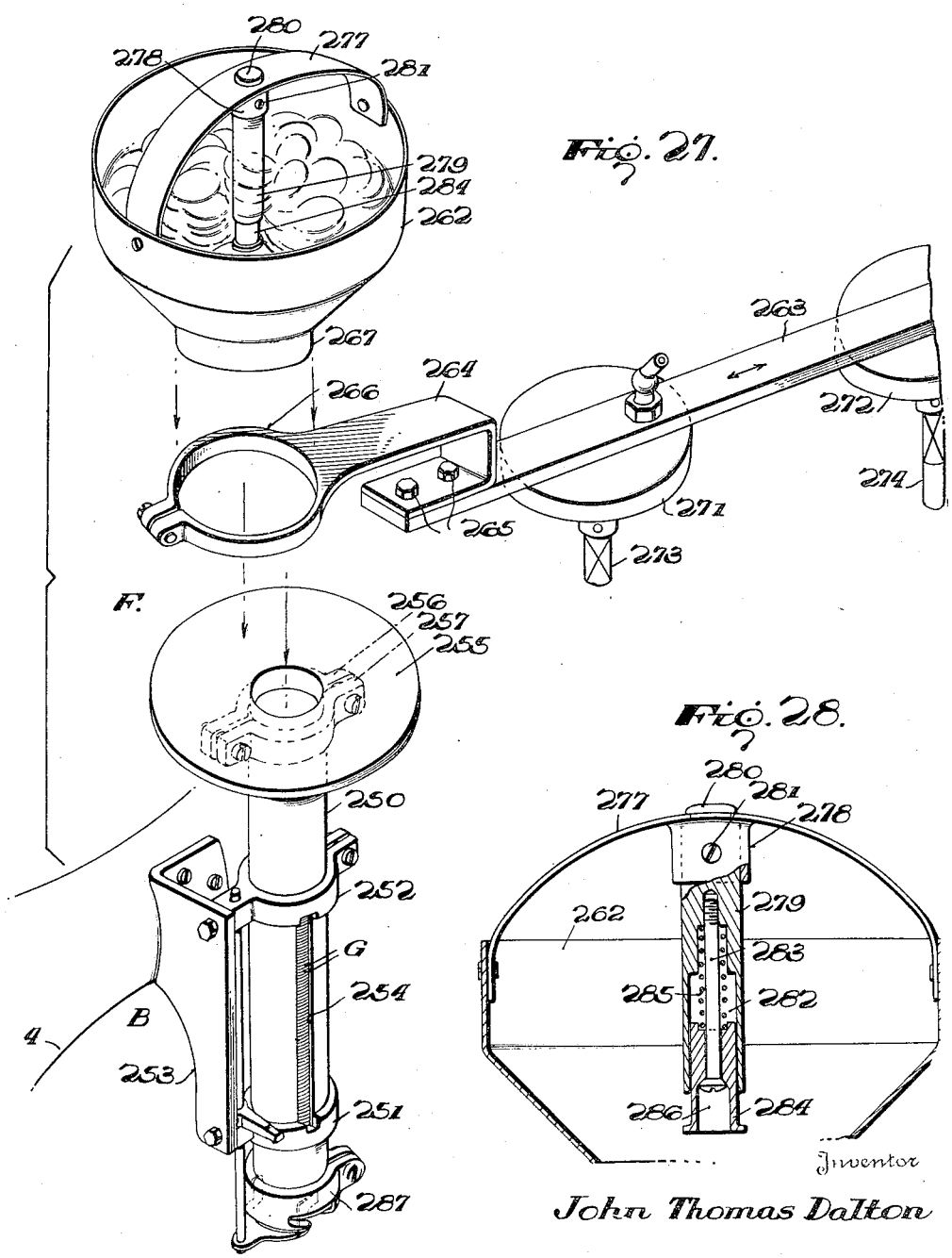

Patented July 16, 1940

2,207,912

UNITED STATES PATENT OFFICE 2,207,912

ATTACHMENT FOR STAPLING MACHINES

John Thomas Dalton, Durham, N. C., assignor to Golden Belt Manufacturing Company, Inc., Durham, N. C., a corporation of New Jersey Application October 14, 1938, Serial No. 234,916

37 Claims. (Cl. 1—2)

This invention relates to wire stitchers or stapling machines and more particularly to a feeding attachment for a wire stitcher or stapling machine.

Some products, such as tobacco, are sold in bags provided with a draw string for closing them. It is customary to secure a tag on which the trade mark of the manufacturer or other identifying data is printed to one of the strings which close the bag. Heretofore these tags have been secured by hand. In the present invention I provide apparatus for feeding such tags to the anvil of a stapling machine or wire stitcher and for feeding bags into such position that one of the strings may be drawn over the anvil and the tag secured thereto.

The invention comprises improved means for feeding a tag or the like to the anvil for each operation of the stitcher head and for coordinating therewith the delivery of a bag into such position that the tag may be secured to one of the strings when the stitcher head descends.

The invention further includes bag feeding means comprising a pair of arms, one of which is pivoted, whereby the arms may assume either an opened or closed position, together with means for opening and closing the arms to permit them to receive a bag and hold it during the stitching operation and to release it after the completion of the stitching operation.

The tag feeding mechanism comprises means whereby the tag is delivered to one of a plurality of holders arranged in the form of a spider and having a step by step movement whereby the tags are delivered to the anvil. The tag feeding means also includes positioning means whereby the opening in the tag through which the string was heretofore passed and tied is always arranged in the same position so that the string is stitched to each tag at a point adjacent this opening.

In the accompanying drawings I have shown one embodiment of the invention. In this showing:

Fig. 1 and Fig. 1—A are a side elevation of the machine;

Fig. 2 and Fig. 2—A are an end elevation of the machine;

Fig. 3 is a perspective view of a portion of a sprocket chain showing one of the bag holders of the bag feeding mechanism;

Fig. 4 is a similar view of the bag holder showing the parts disassembled;

Fig. 5 is a detailed, perspective view of a reciprocating tag feeding member;

Fig. 6 is a perspective view of a portion of a sprocket chain forming a part of the bag discharge means;

Fig. 7 is a similar view showing one of the bag discharge members disassembled;

Fig. 8 is a detailed view of a portion of the drive mechanism showing the means for forcing the bags forwardly in the bag delivery mechanism and the drive of the bag feeding mechanism;

Fig. 9 is a schematic, perspective view showing the main drive mechanism, and the drive mechanism for the tag feeding means;

Fig. 10 is a perspective view of the drive mechanism of the bag discharge means;

Fig. 11 is a detailed, perspective view of the lower portion of the tag delivery tube and its associated parts;

Fig. 12 is a perspective view of the lower portion of the tag feeding tube in an inverted position;

Fig. 13 and Fig. 14 are detailed views of portions of the tag feeding tube;

Fig. 15 is a plan view with parts removed showing the spider by means of which tags are delivered individually to the anvil and illustrating the feed of the bags;

Fig. 16 is a perspective view of the drive mechanism with parts separated to show the step by step feeding mechanism of the spider;

Fig. 17 is a detailed view of the tag positioning means;

Fig. 18 is a perspective view of another portion of the drive mechanism showing the means for operating the hook by means of which the bag string is brought into positioning for the stitching operation;

Fig. 19 is an end elevation of parts shown in Fig. 18;

Fig. 20 is a detailed view of a pair of star wheels arranged at the inlet end of the bag discharge mechanism;

Fig. 21 is a detailed view of the bag delivery chute with the sides removed;

Fig. 22 is a plan view thereof;

Fig. 23 is a detailed view of one of the arms of the bag lifting member;

Fig. 24 is a detailed view of one side of the lower end of the delivery chute showing the deflector whereby the bags are brought in proper position for delivery of the bag feeding mechanism;

Fig. 25 is a similar view of the lower end of the other side of the delivery chute;

Fig. 26 is a detailed view showing the position of the bag with respect to the stitching machine just prior to the stitching operation;

Fig. 27 is a detail view of the upper end of the tag delivery tube with the hopper removed showing the means for oscillating the hopper; and Fig. 28 is a detailed, sectional view of the upper portion of the tag feeding hopper.

General description of the machine

The apparatus forming the subject matter of the present invention, in its broadest aspect, comprises a frame A, a wire stitcher B, a bag delivering means C, a bag feeding mechanism D, a bag discharge mechanism E, and a tag feeding means F.

In the operation of the machine, tags G are fed from the tag feeding means F singly with a step by step motion to the anvil of the wire stitching machine and bags H are delivered from the bag delivery means to the bag feeding mechanism singly and then fed past the anvil of the wire stitching machine with a step by step motion so that a tag G and a bag H are properly arranged for each descent of the stitcher head to secure a tag to one of the strings of the bag. The bag feeding mechanism then delivers the bag with the tag attached to the string to the bag discharge mechanism whence it is carried from the machine.

The frame may be of any suitable construction for supporting the various parts and preferably consists of a bed or table 1 and a plurality of legs 2.

Figure 2:
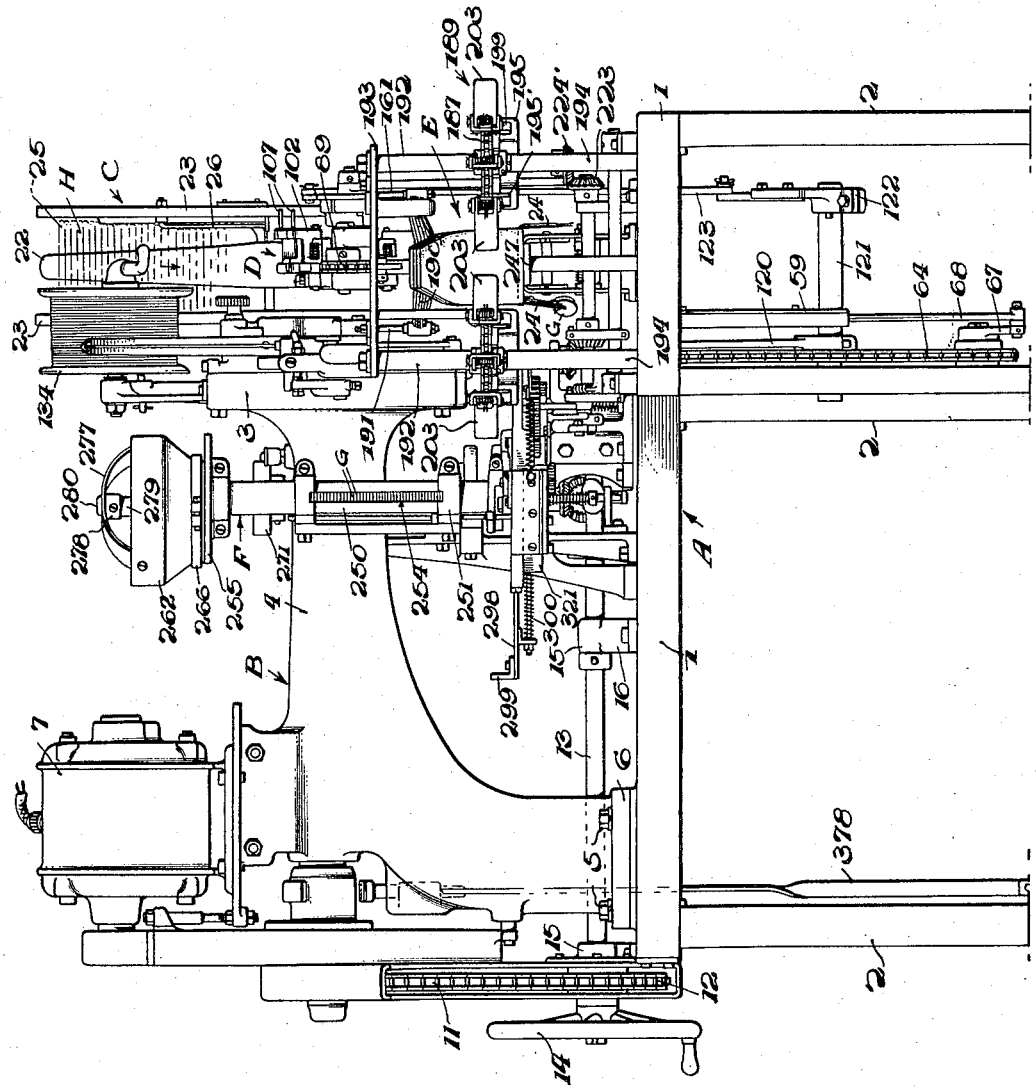

The wire stitching machine may be of any suitable construction, for instance, such as is shown in the patent to Maynard, No. 1,302,402. A detailed description thereof is, therefore, believed to be unnecessary. As shown (see Fig. 2), the wire stitching mechanism may comprise a suitable stitching head 3 mounted on an arm 4 secured to the bed of the machine by bolts 5 arranged in flanges 6 on the base of the wire stitcher. It may be driven by a motor 7 whose shaft is provided with a pinion 8 (see Fig. 9) meshing with a gear 9 mounted on the main shaft (not shown) of the wire stitching machine, which shaft extends through the horizontal portion of the arm 4.

The main shaft of the wire stitcher is also provided with a sprocket wheel 10 over which passes a chain 11 and the chain also passes over a sprocket wheel 12 mounted on a shaft 13. The end of shaft 13 may be provided with a hand wheel 14 to permit manual operation of the machine. Shaft 13 is mounted in suitable journals 15 carried by brackets 16 secured to the bed of the machine and extends forwardly. Adjacent the front of the machine it drives a main shaft 17 through suitable bevel gears 18 and 19.

The shaft 13 extends beyond the main shaft passing through a bearing carried by a bracket 20 on the bed of the machine and is provided with a crank 21 on its end to drive portions of the bag delivering mechanism.

Bag delivering mechanism

Figure 1:
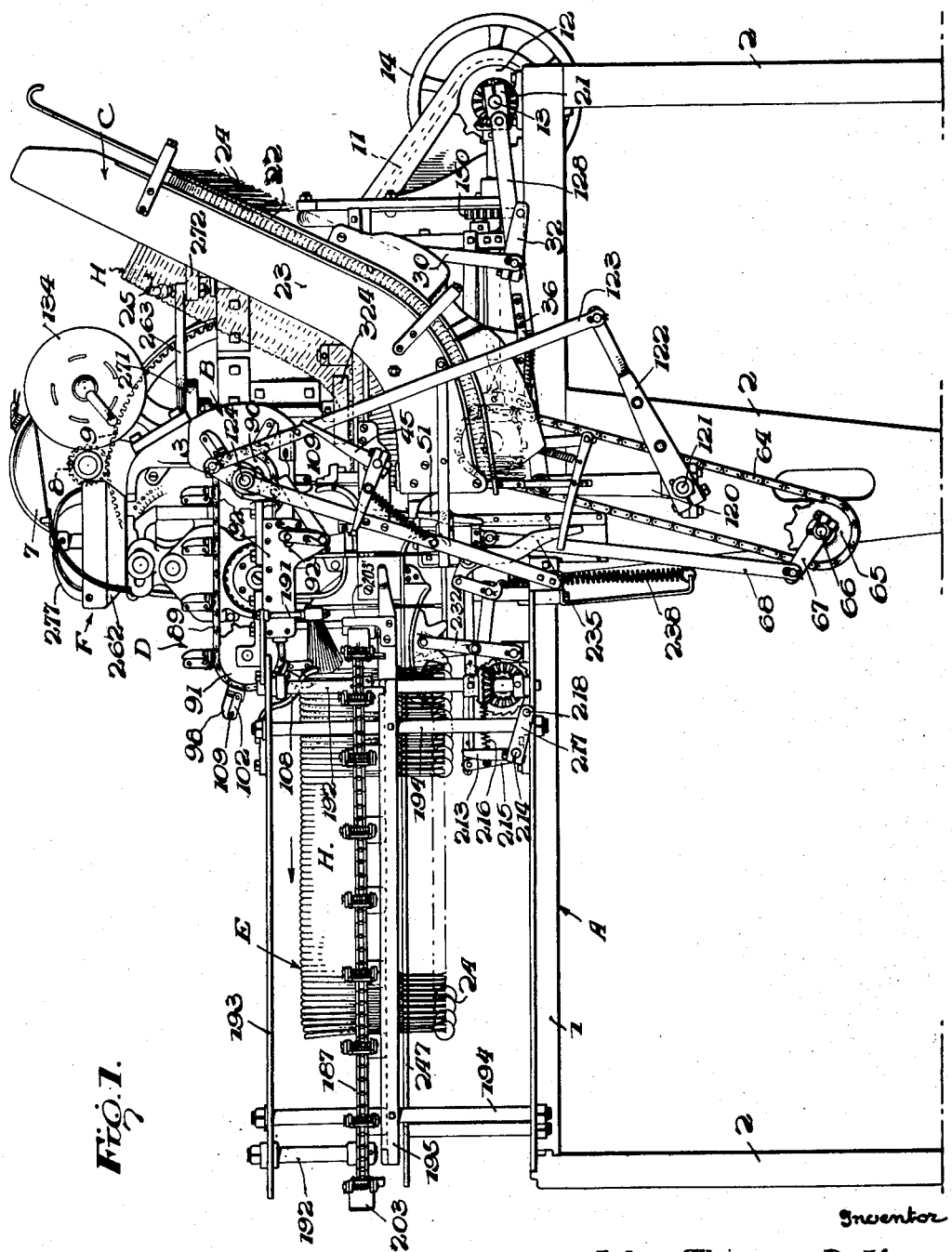

The bag delivering mechanism (see Figs. 1, 21, 22, 24 and 25) comprises a curved bottom 22 and a pair of side walls 23. The side walls are slightly spaced from the bottom as shown in Fig. 1 of the drawings to permit the strings 24 to hang below the bottom as shown in Fig. 21. As shown in Fig. 21, the bags G are of their greatest width adjacent the top and when the bags are arranged in inverted position in the chute of the bag delivery mechanism, the narrower bottom portions 25 are spaced from the side walls 23 of the chute. Throughout a portion of the chute I provide guide members 26 (see Fig. 22) to engage this portion of the bags. The bottom of the bag delivering means is provided with a pair of spaced slots 27. Crank 21 on the end of shaft 13 is connected to a link 28 (see Fig. 8) and this link is provided with a projecting pin 29. Pin 29 carries an arm 30 having a forked end 31. The pin also carries a crank 32 connected to a spring 33, the other end of which is secured to the link 28. Operation of the link 28 by the crank 21 imparts an oscillating motion to the arm 30 and the forked ends 31 of this arm, projecting through the slots 27 in the bottom of the chute continually force the bags toward the lower end of the chute. Spring 33 retains the forked ends of the arm in engagement with the bags in the chute.

Beyond the slots 27 the bottom of the chute is also provided with a pair of slots 34 arranged on each side of a centrally located wider slot 35. The link 28 carries an arm 36 and a pair of fingers 37 are pivotally mounted on the end of this arm. Fingers 37 are normally urged forward by a coil spring 38 secured to the fingers 37 adjacent the pivot and to the arm 36. These fingers enter the slots 34 and the oscillation of link 28 causes them to engage the bags to feed them forwardly in the chute. Arm 36 is also provided with a bracket 39 which carries another arm 40. This arm enters the slot 35 to engage the bags and force them toward the delivery end of the chute. At the delivery end of the chute there is provided a plate 41 having a notch or recess 42 at its upper end (see Figs. 8 and 21). This plate is mounted on a rock shaft 43 carried by a bracket 44. An arm 45 is secured to the shaft 43 and is adapted to engage suitable drive means to rock the plate 41 from the dotted line position shown in Fig. 8 of the drawings to the full line position to pack the bags. The shaft is provided with a second arm 46 to which is connected a spring 47 normally retaining the plate 41 in the dotted line position shown in Fig. 8 of the drawings.

At the lower end of the chute the bags are lifted individually by a bag lifting member 51 and delivered to the bag feeding means D. The bag lifting member 51 consists of a pair of arms, the ends of which are slotted as at 52 (see Fig. 23). Needles or pins 53 are inserted in the slots and they are held in position by set screws 54 received in threaded openings in the two portions of the arm. These arms are pivotally mounted on a suitable bracket 55 (see Fig. 21) and are normally pressed toward the bags by means of springs 56. The movement of the upper ends of the arms toward the bags is controlled by a stop arm 57. Arms 55 and 57 are carried by a cross head 58 mounted in a suitable guide 59 (see Fig. 9 and Fig. 21) secured to the front of the machine. The cross head is caused to reciprocate in the guide 59 by drive mechanism connected to the main shaft 17. As shown in Fig. 9, the end of this shaft is provided with a bevel gear 60 meshing with a bevel gear 61 on a stub shaft 62 extending toward the front of the machine. Shaft 62 is provided with a sprocket wheel 63 over which passes a chain 64. The chain also passes over a sprocket wheel 65 mounted on a stub shaft 66 carried on one of the front legs of the machine as shown in Fig. 1. Sprocket 65 carries a crank 67 which is connected to the cross head by a link 68.

Arms 51 of the bag lifting mechanism are received in the slot or notch 42 in the end of plate 41 when in lowered position. Beneath plate 41 and arms 51 I provide a combing device which is adapted to engage the foremost bag adjacent the bottom and exert a downward pull on it. This combing device comprises a rod 69 which passes through an opening in the forward end of the bottom 22 of the chute and carries a bag engaging member 70 which is adapted to engage the foremost bag and pull it downwardly. A coil spring (not shown) is arranged between the rod 69 and the bag engaging member 70 to normally force the lower end of the bag engaging member outwardly from the arm but to permit it to give slightly when it engages the bag. Arm 69 is connected to a link 71 mounted on a bracket 72 secured to the front end of chute 22. This link extends into the path of a roller 224 carried by a pin 73 on cross head 58. A spring 74 normally tends to hold the arm 69 in raised position and the upward movement of the arm is limited by a stop 75. In operation upon the descent of the cross head 58, roller 224 engages link 71 to move it downwardly against the tension of spring 74 and cause the bag engaging member 70 to engage the stitching of the bag and pull it downwardly. As each bag is lifted by the lifting arms, the friction against the next bag has a tendency to raise it slightly. The combing arm pulls this bag back to its proper position so that when it is engaged by the next operation of the bag lifting mechanism, it will be properly delivered to the bag feeding mechanism.

At the delivery end of the chute the side wall 23 on the side remote from the anvil is provided with a deflector 76 (see Figs. 22 and 24) adapted to force the bag toward the opposite side of the chute. An arm 77 also carries a deflector plate 78 arranged above the side wall so that the bag will be continued to be forced toward the anvil after the bag lifting mechanism has raised it. The opposite side of the chute is provided with means for feeding the bag in such manner that the string will be in position to be brought over the anvil. For this purpose there is provided a plate 79 secured to the side wall 23 carrying a spring blade member 80' cooperating with a second plate 80 arranged at the delivery end of the chute. These two members form a guide-way (see Fig. 22) through which the string of the bag passes as the bag travels longitudinally of the chute. As the bag is raised, the string passes through a guide-way formed by the upper end of plate 80 and 80' and the deflector end of the plate 81 is suitably supported on the frame of the machine.

*Bag feeding mechanism*

The bag feeding mechanism consists of a sprocket chain having a plurality of bag holders adapted to receive the bags lifted by the arms 51. The detailed construction of the bag holders is shown in Figs. 3 and 4 of the drawings and the drive of the feeding mechanism in association with related parts is shown in Fig. 8 of the drawings. As shown, a sprocket chain 89 passes over sprocket wheels 90 and 91 carried by a suitable auxiliary frame member 92 on the front of the machine (see Fig. 1). The chain 89 carries a plurality of clips 93 (see Fig. 4) to secure the bag holders to the chain. These clips are provided with openings 94 for the reception of fastening elements 95 which pass through threaded openings 96 in a plate 97 which forms the supporting means of the bag holders. Each of the plates 97 is provided with a stationary arm 98 secured thereto in any suitable manner as by fastening elements 99. The opposite end of the plate is provided with a plurality of ears 100 having aligned openings 101. A member 102 is pivotally mounted in the ears 100, the member 102 having aligned openings 103 and being adapted to be pivoted in the ears 100 by means of a pivot pin 104 which passes through the openings 101 and 103. This pivot pin may be secured in place by any suitable means such as by a cotter pin 105. A spring 106 is arranged around the pin 104, the spring having one end in engagement with the base plate 97 and its other end in engagement with a portion of the member 102 whereby the bag holder is normally retained in the closed position shown in Fig. 3 of the drawings. The member 102, however, is provided with a projecting pin 107 which cooperates with suitable tripping mechanism to swing the member 102 on its pivot, against the tension of spring 106, to open the bag holding member to permit the reception and release of a bag.

These tripping members are shown in Fig. 8 of the drawings. A tripping member 108 is carried by the frame of the bag discharge mechanism to open the member 102 when the bag feeding mechanism approaches the end of its flight, the tripping member 108 being engaged by pin 107 to swing the member 102 on its pivot against the tension of spring 106. At the opposite end a trip 109 also opens the bag holding member at the proper time to receive a bag from the bag lifting member. This tripping member is carried by an arm 110 which is movably mounted on the frame of the machine and is connected to an arm 111 of a bell crank lever 112. The bell crank lever is mounted on a shaft 113 and a spring 114 surrounds the shaft. One end of this spring is secured to a portion of the frame of the machine and the other end is secured to the arm 111 of the bell crank lever to normally retain the trip 109 in a retracted position. A pin 115 is carried by the arm 111 of the bell crank lever and is connected to the arm 110 to oscillate it and the trip 109 into the path of the arm 107 of the bag holding member when the bell crank lever is swung upon its pivot.

A step by step movement is imparted to sprocket chain 89 by means of suitable driving elements connected to crank 21 and link 28. The end of the link 28 is connected to a crank 120 mounted upon a shaft 121 carried on one of the legs of the machine (see Fig. 8). Shaft 121 is thus oscillated and it in turn carries a second crank 122 which is connnected to a link 123. The sprocket wheel 90 is mounted on a shaft 124, and this shaft is provided with an extension. The extended end of shaft 124 is received in a bearing 125 carried by an arm 126 secured to the frame of the machine, as at 127. The extended portion of the shaft is provided with a ratchet wheel 128. Link 123 is connected to a walking beam member 129 which is mounted to oscillate on the shaft 124, and this member in turn carries a pawl 130. Pawl 130 engages the ratchet wheel 128 to impart a step by step movement to shaft 124 and thus to the bag feeding mechanism.

Link 123 is provided with a pin 131 which engages arm 45 to rock the shaft 43 and oscillate the plate 41 which straightens the first bag, and insures its proper delivery to bag feeding members 98—102. The drive mechanism heretofore described also oscillates the bell crank lever 111—112 to control trip 109. When the walking beam 129 rotates in a counter-clockwise direction, it strikes the end of the arm 112 to oscillate the bell crank lever on its pivot and move the trip 109 into operative position.

When the bag has been lifted and engaged by the bag feeding members 98—102, the bag string on the side toward the anvil is engaged by a hook 132 and carried over a tag on the anvil and stapled. The positions of the bag in the movement through the bag feeding mechanism are shown in Fig. 15 of the drawings. The bags are lifted to the bag feeding mechanism and the bag feeding mechanism then comes to a position of rest with the bag in a position substantially opposite the anvil and remains there during the descent of the head and the stitching of the tag to the bag string 24. After the ascent of the stitcher head, the bag feeding mechanism carries the bag with a step by step movement to the next position of the bag feeding mechanism and finally delivers it to the bag discharge mechanism. The step by step movement of sprocket chain 89 then feeds the bag on to the next station after the stapling operation. The operation of this hook is best shown in Figs. 18 and 19 of the drawings and the position of the bag string with respect to the stitching machine and the tag is best shown in Fig. 26 of the drawings. As shown in Fig. 26 an anvil 133 is arranged beneath the stitcher head 3. The stitcher head carries a reel 134 upon which is mounted a coil of wire and this wire is delivered through a guide tube 135 into the stitcher head. A tag G is delivered to the anvil between each two descents of the stitcher head and bag H carried by one of the holders 98—102 of the bag feeding mechanism is brought into position toward the anvil to permit the bag string 24 on the side of the bag adjacent the anvil to be carried over the anvil into position for the stitching operation.

The hook 132 is caused to oscillate to engage the string 24 at the desired time by drive means driven from main shaft 17. As shown (see Fig. 9), this shaft is provided with a roller 136 having a cam groove. The cam groove is adapted to receive a pair of rollers 137 mounted on a reciprocating member 138 which travels in a suitable guide 139 on the frame of the machine (see Fig. 18). Hook 132 is carried by a substantially horizontal arm 140 mounted on the end of a curved arm 141. The opposite end of arm 141 is pivoted to the reciprocating member 138 as at 142.

Reciprocating member 138 also carries an oscillating shaft 143 and this shaft is provided with an elongated pinion or gear 144. This gear meshes with a rack 145 traveling in suitable guides 146 carried by a plate or support 147 which is arranged over the reciprocating member, and is mounted on an arm supported from the frame of the machine. The rack in turn is reciprocated by means of a cam 148 mounted on a shaft 149 arranged adjacent to and parallel to the main shaft 17. Shaft 149 is driven from the main shaft by gears 150 and 151 mounted on the two shafts and meshing with each other. An arm 152 is pivoted on the bed of the machine and carries a roller 153 which is received in the groove of cam 148. This arm is connected to rack 145 by link 154. The end of reciprocating shaft 143 is provided with a crank 155 which is connected to the arm 141 by a link 156. It will thus be seen that the movement of reciprocating member 138 moves the hook 132 toward and away from the anvil across the front of the machine and at the same time, the oscillation of shaft 143 swings arm 141 on its pivot so as to move the end of the hook inwardly and bring the string 24 over the anvil as shown in Fig. 26 of the drawings. The string is carried to the anvil in a groove formed by a pair of guide members 157 mounted on a plate 158 (see Fig. 22). The arrangement of the connection between reciprocating shaft 143 and supporting arm 141 at a point adjacent the pivot 142 produces a wide swinging movement of the hook with a slight oscillation of shaft 143.

The forward end of the reciprocating member also carries a vertical arm 159 to which is secured a horizontal member 160 having a slot 161 in its end, this slot being adapted to engage the edge of the tag at the time that the bag string is being brought over the tag as shown in Fig. 18.

Bag discharge mechanism

After the tag has been stitched to the string of the bag and as the bag approaches the sprocket wheel 91 of the feeding mechanism, it is delivered to the bag discharge mechanism. The bag discharge mechanism consists essentially of a pair of sprocket chains 187 mounted on horizontally arranged sprocket wheels 188 (see Fig. 10) each of the sprocket wheels being provided with a plurality of spaced holding members 189 (see Figs. 6 and 7) which project laterally toward each other and receive a plurality of bags between the two adjacent pairs of said members. When the bag holding member of the bag feeding means engages trip 108, members 98 and 102 are separated and, as this occurs, the bag passes into the bag discharge mechanism and is retained therein by a pair of brushes 190 arranged at the inlet end of the bag discharge mechanism. These brushes are carried by arms 191 supported from the frame work of the bag discharge mechanism. After the number of bags which are adapted to be received between each two pairs of the members 189 have been thus received by the bag discharge mechanism, a pair of the members 189 engage the last bag to urge the bags toward the discharge end.

Sprockets 188 are mounted on shafts 192 carried by horizontal member 193 forming the top frame of the bag discharging mechanism. This horizontal member is supported from the bed of the machine by vertical posts 194. Beneath each of the chains there is provided a guide member 195 having a groove 195' for the reception of a portion of the bag holding member 189. As shown in Figs. 6 and 7 of the drawings, clips 196 are mounted on certain of the links of the sprocket chains. A supporting member 197 and a guide plate 199 are secured to each of these clips. The member 197 and the guide plate 199 may be secured to the clips in any suitable way as by the provision of aligned openings 200 through which suitable fastening members 201 are passed. Guide members 199 are received in grooves 195' to guide the movement of the chains. Supporting member 197 is provided with ears 198. Ears 198 are provided with openings 202 and the member 197 pivotally supports a laterally extending plate 203. As shown, one end of this plate is provided with bearing portions 204 having openings 205 adapted to be aligned with the openings 202. A pivot pin 206 is passed through the aligned openings and is held in place by any suitable means, such as cotter pin 207. A pair of springs 208 surround the pivot pin 206, these springs each having one end 209 engaging the supporting member 197 and their other ends 210 engaging the lateral plate 203 to normally retain the plate in a position at right angles to the path of travel of the sprocket chain. The action of the spring on the lateral plate 203 is controlled by stops 211 formed on the ends of the bearing portions 204, these stops being adapted to engage one side of the supporting member 197. As the sprocket chains move toward the inlet end of the bag discharge mechanism, the plates 203 are held against the tension of springs 208—210 by a stop member 203' until the proper number of bags are received in the section between the approaching plates 203 and the preceding pair of plates.

The bag discharge mechanism is driven from the reciprocating member 138 by means of a rod 212 which extends from the reciprocating member 138 to a point adjacent the inlet end of the discharge mechanism. The end of rod 212 engages an arm 213 (see Fig. 9) which is mounted on a rock shaft 214. The rock shaft carries a second arm 215 to which is attached a spring 215 secured to the frame of the machine and normally urging the arm 215 and the rock shaft 214 in a clockwise direction in Fig. 9 of the drawings. The opposite end of rock shaft 214 carries an arm 217 having a pin 218 adapted to engage the bed of the machine to limit the movement of the shaft in this direction. Movement of the reciprocating member 138 and the rod 212 causes the shaft to be oscillated in a reverse direction. This oscillation imparts a step by step movement to a shaft 219 (see Fig. 10) by means of a pawl 220 carried by the arm 215 and a ratchet wheel 221 mounted on the shaft 219. The pawl tooth is normally urged toward the ratchet wheel by a spring 222 but is free to ride over the tooth of the ratchet in a reverse direction after each movement of the arm 213 by the rod 212. Shaft 219 is provided with a pair of bevel gears 223 meshing with bevel gears 224' on the shafts 192 of the bag discharge mechanism at the inlet end. This imparts a step by step movement to the sprocket chains of the bag discharge mechanism.

To further insure delivery of the bags from the bag feeding mechanism to the bag discharge mechanism, I provide a pair of star wheels 230 (see Fig. 20) to which is imparted a step by step motion coordinated with the feed of the bags. These star wheels engage the bags adjacent the bottom and move them forwardly along the discharge mechanism. The star wheels are carried on a shaft 231 mounted in substantially H-shaped frame 232 pivoted on a support or bracket 233 carried on the bed of the machine. Counter-clockwise motion is imparted to the star wheels by suitable drive mechanism shown in Figs. 9 and 20. Pin 73 on cross head 58 which actuates the bag lifting mechanism of the bag delivery means, is adapted to engage a cam lever 235 on the downward movement of the cross head. Lever 235 is pivotally mounted on a pin 236 carried by the cross head guide or frame 59. An arm or link 237 is connected to lever 235. A spring 238 is connected to the lower end of link 237 to normally pull it downwardly and this link is raised by the actuation of lever 235. The link is connected to an arm 239 carried by the star wheel frame 232 to impart an oscillating movement thereto. Arm 239 is connected to a cross bar 240 forming a part of the H-shaped frame. Above arm 239 frame 232 carries a shaft 241. This shaft carries arm 242 having a pawl 243 on its free end adjacent shaft 231. A spring 244, which surrounds the shaft, has its ends connected to cross bar 240 and to a pin carried by the arm 242, respectively, to urge the arms 242 in a clockwise direction. Pawl 243 engages a ratchet wheel 246 on shaft 231 to prevent rotation of the shaft and the star wheels 230 in a clockwise direction. The plate forming the bottom of the discharge mechanism is provided with an extension 247 and on its under side it carries an actuating pawl 248. Pawl 248 engages one of the teeth of ratchet wheel 246 each time the frame 232 is swung on its pivot to move the shaft in a counter-clockwise direction and thus move the star wheels to deliver the bags into the discharge mechanism. Pawl 248 is connected to a spring 249 to provide sufficient resiliency to properly operate. The plate forming the bottom of the bag discharge mechanism is provided with an extension 247 and on its under side it carries a holding pawl 248 which is adapted to engage one of the teeth of ratchet 246 after each movement to prevent the star wheels from moving in a reverse direction. This pawl 248 is connected to a spring 249 to provide sufficient resiliency to permit it to move over the teeth of the ratchet when the shaft is actuated.

*Tag delivery means*

The tags to be stitched to the strings of the bags are delivered to the anvil of the stitching machine from a tube 250 which has an inner diameter slightly greater than the diameter of the tags and in which the tags are arranged in stacked relation as shown in Figs. 12 and 27 of the drawings. The tube is supported by means of a pair of collars 251 and 252 secured to an arm 253 which is in turn supported from a bracket. The tube is provided with a slot 254 to permit inspection of the interior. A plate 255 is arranged on the upper end of the tube, this plate carrying one element of a clamp 256 on its lower side adapted to cooperate with a similar element 257 to secure the plate in position. This plate is also provided with an opening of substantially the same diameter as the diameter of the caps. A hopper 262 is arranged on this plate, the hopper having an opening larger than the internal diameter of tube 250. The hopper is oscillated on the plate 255 to agitate the tags and feed them into the tube. The hopper is oscillated by means of a rod 263 to which is connected an arm 264 as shown at 265. The end of arm 264 is provided with a collar 266 which surrounds a circular neck 267 on the bottom of the hopper. Rod 263 is oscillated by means of a pair of discs 271 and 272 (see Fig. 9) to which it is eccentrically connected. These discs are rotated by vertical shafts 273 and 274, which shafts are in turn driven from shaft 149 by means of bevel gears 275 and 276.

To facilitate the feed of the tags into the tube, the hopper is provided with a pushing device which extends to a point adjacent the opening in the bottom of the hopper and which is yieldingly supported. As shown in Fig. 28, an arm or bail 277 extends across the top of the hopper and is provided with a sleeve 278 adapted to receive a member 279. The member 279 is provided with a head 280 which passes through an opening in the bail 277 and it is secured in the sleeve 278 by a set screw 281. The lower end of member 279 is provided with a bore 282, the upper portion of which is reduced and beyond the reduced portion it is provided with a threaded portion for the reception of a screw 283. A yielding member 284 is mounted on the screw 283 and is free to ride upwardly on the screw against the tension of a spring 285. The spring 285 thus retains the member 284 in lowered position so that as the hopper is oscillated, it tends to force the tags into the top of the tube but if the tags should jam, the member 284 may move upwardly against the tension of the spring 285 to prevent destruction of the tags. Screw 283 is received in a recess 286 in the bottom of the member 284 to prevent contact of the screw head with the tags and possible injury to them.

The bottom of the tube is surrounded by a collar 287 and this collar and the tube are cut away at one side to permit delivery of the tags from the tube as shown in the inverted view (Fig. 12). The collar 287 is provided with suitable lugs or projections 288 to support the column of tags. An arcuate member 289 is arranged beneath the collar 287 and is provided with a pair of arms or fingers 290 and 291 projecting into the bottom of the tube as shown in Fig. 12. This arcuate member is connected to a rod 292 which extends up one side of the exterior of the tube and is provided with a handle 293. This member is provided for the purpose of permitting the tags to be raised and lowered in the tube if the tags should become clogged in the tube so as to release a canted tag and permit the tags to properly feed. By raising rod 292 and retaining it in raised position, the fingers 290—291 retain the tags in a position above the feeding mechanism at the bottom of the tube and interrupt the feed of tags if it is desired to do so. A spring strip 294 is also secured to the exterior of the tube and is provided with a collar 295 carrying an arm 296 which projects through a slot in the tube. The lower end of this member is provided with cam portion 297. The tube is also provided with manually operated means for arresting the delivery of the tags from the bottom of the tube. As shown, a plate 298 is slidably supported on the frame of the machine and is provided with a handle 299 at its outer end. This plate carries a rod which is surrounded by a spring 300 to normally retain it in withdrawn position. The end of the plate is provided with a pair of fingers 301 which are adapted to enter on each side of one of the lugs 288 (see Fig. 12) to engage the bottom tag. These fingers may be employed to manually remove a tag from the bottom of the tube when the edge of the tag has become damaged or distorted so that it can not be gripped by the tag delivery mechanism.

The tags are taken from the bottom of the tube and delivered to a spider 307 by a reciprocating tag feeding member shown in detail in Fig. 5 of the drawings. This member comprises a rod 308 having one finger 309 permanently mounted thereon. The end of the rod is provided with a pair of spaced ears 310 having aligned openings 311. A finger 312 which is adapted to cooperate with the finger 309 is pivotally mounted in the ears 310. As shown, the finger 312 is carried by a member 313 having aligned openings 314. A pin 315 passes through the openings 311 and 314 to pivotally connect the two members together. The end of the rod 308 adjacent the ears 310 is provided with a bore adapted to receive a spring 316. This spring bears against the face of an extension 317 on the bottom of the member 313 to normally retain the fingers 309 and 312 in closed position. The forward end of the member 313 at the side opposite from the finger 312 is provided with an extension 318 which engages a cam to open the fingers against the tension of the spring when the tag feeding device enters the bottom of the tube. Likewise the opposite end of the member 313 is provided with a lug 319 which functions to open the fingers when the tag is to be delivered to one of the arms of the spider 307. The rod 308 is also provided with a projecting pin 320. Rod 308 is reciprocated to bring the tag feeding device into and out of the bottom of the tube. A similar member 321 is arranged adjacent the rod 308 (see Fig. 11) and is reciprocated in unison therewith. This member 321 carries a cam plate 322 which is adapted to be reciprocated into the path of the extension 318 when the tag feeding members 309 and 312 are in the tube to cause them to open and receive one of the tags. When the rod 308 is then reciprocated in the opposite direction, lug 319 engages a cooperating member 323 carried by the rod 321 to again open the fingers 309 and 312 when the tag is to be delivered to the spider.

The reciprocating members 308 and 321 are actuated from a pair of cams 324 and 325. These cams are provided with grooves adapted to receive cam rollers 326 and 327 respectively. Cam roller 326 is carried by an arm 328 that is mounted in a sliding pivot 329 on the frame of the machine beyond the cam. This arm 328 is connected to a link 330. The other end of the link is connected to the pin 320 of the reciprocating member 308. The roller 327 is carried by an arm 331 pivoted to the frame of the machine at 332 between the cam and its end. Arm 331 is provided with a slot 333 adjacent its end which is adapted to receive a pin 334 carried by the reciprocating member 321.

The spider 307 is driven with a step by step motion and carries a plurality of pairs of gripping members generally designated 340 which receive the tags from the tag feeding member 309—312 when the rod 308 is in its outer position. These gripping members consist of pairs of jaws 341 and 342, one of which is pivoted. These jaws are normally closed by a spring arranged on the pivot. These jaws are opened to release the tag after the stitching operation at a point midway between the position of the spider 307 during the stitching operation and its next position, and are retained open throughout a portion of their revolution until they receive another tag. The opening of the jaws is controlled by means of a cam 343 which is provided with a circular portion 344 having a central opening 345. The circular portion of the cam is arranged on the shaft of the spider 307 beneath the arms and gripping members. This cam is provided with an arm 346 and is adapted to be oscillated at proper intervals by the reciprocating member 308. As shown, the arm 346 carries an arm or projection 347 which extends below the member 323 and is positioned to be engaged by the rear end of the member 313 when the tag delivering member is in its outer position. A spring 348 is connected to the end of the arm 346 and to the frame of the machine to normally retain the cam in one position.

A step by step movement is imparted to the spider 307 by means of drive mechanism shown in Figs. 9 and 16 of the drawings. Vertical shaft 273 is provided with a pinion 350 and this pinion meshes with a gear 351 carried on a vertical shaft 352. Above the pinion the shaft 352 is provided with one element 353 of a Geneva movement, the pin 354 of which engages slots 355 in the lower face of a gear 356 which forms the other half of the Geneva movement. The gear 356 is carried on shaft 357 of the spider 307 and thus imparts a step by step movement to the spider to coordinate the feed of the tags to the operations of the head of the stitching machine.

The tags G are provided with small openings 360 and, as the tags are delivered to the tube 250 by the oscillation of the hopper 262, it is necessary to provide means for positioning this opening 360 as the tag is delivered from the tube if uniformity is desired in the stitching of the tag to the bag string. For this purpose I provide a rod 361 below the tube (see Figs. 11 and 16). This rod is supported in a bracket 362' carried by the frame of the machine and is surrounded by a spring 363' to normally retain it in a lowered position. The shaft 149 is provided with a cam 362 upon its end adapted to engage a roller 363 carried by an arm 364. The arm 364 is pivoted intermediate its ends as at 365 and is provided with a flattended end 366 engaging the bottom of the rod 361. The rod 361 is thus moved upwardly against the tension of spring 363' upon each revolution of the shaft 149. This rod carries an elongated gear 367 adjacent its upper end just below the bottom of the tube (see Fig. 16). The elongated gear 367 is driven from gear 356 on the shaft of the spider by an intermediate gear 368, the ratio of the teeth of the gears being such that upon each step by step movement of gear 356, the gear 367 will make a complete revolution. Above the gear 367 the end of rod 361 is provided with a key 369 (see Fig. 17) which is adapted to be received in a ferrule 370 mounted in a central opening in a disc 371. The ferrule is provided with engaging means for the key to lock the disc to the shaft. A pin 372 projects through the disc and is properly arranged circumferentially to enter the hole 360 of the lowermost tag in the tube upon rotation of the disc. The pin is retained in proper position by means of a spring 373 which is in the form of a segment of a ring having one end secured to the pin as at 373' and the other end secured to the opposite side of the disc as at 374.

The operation of the member 294 is also controlled by the disc 371. When the disc is in its lowered position, cam portion 297 rests against it relieving the spring pressure from the finger 296 and therefore not exerting any pressure on the tags at the time when the disc moves up to its rotating position. As the disc moves upwardly, the member 297 is positioned beneath it allowing the arm 294 to exert pressure on finger 296 which clamps several tags at the bottom of the tube and therefore prevents the tags from rotating before the pin 372 locates the hole 360 of the bottom tag. The member 296 prevents the tags from being rotated by friction between the bottom tag and the disc before the pin 372 has entered the hole 360.

As shown in Figs. 1 and 1—A, the wire stitching machine is provided with the usual operating lever 375 which is pivoted to the frame of the machine at 376 and provided with a foot pedal 377 for manual operation. This lever is connected to the stitcher by a vertically extending lever 378 shown in Fig. 2 of the drawings. When the machine is driven by the motor 7, this lever is locked in operating position.

General description of the machine

While the operation of the machine should be fairly apparent from the preceding description of the construction and inter-relation of the various parts, the operation will be briefly described. The bags H to which the tags G are to be stitched are fed manually into the upper end of the chute of the bag delivery mechanism C, the bags being arranged inverted as shown in Fig. 21 with the string hanging below the bottom 22 of the chute in the spaces between the bottom and the side walls 23. The feed end of the delivery means is arranged at a substantial angle as shown in Fig. 1 of the drawings and the bags feed downwardly by gravity until they approach the bottom whence their delivery toward the front of the machine is facilitated by the feeding members 31, 37 and 40. Properly coordinated with the operation of the stitcher head is the bag combing device 70 and the bag lifting members 51. Upon the descent of the cross head 58 the bag lifting members are first brought to their lowered position shown in Fig. 21 of the drawings and the pin 73 then engages the arm 71 to cause the bag combing device 70 to be lowered grasping the first bag in the chute and pulling it downwardly. This causes the pins 53 of the bag lifting member to engage the material of the bag and carry it upwardly upon the next upward movement of the cross head 58.

As the bag is raised by the bag lifting member, the step by step feed of sprocket chain 69 of the bag feeding mechanism has brought a pair of bag holding members 98—102 into position to be opened by the trip 109 and receive the bag. The bag is then fed by the bag feeding mechanism with a step by step motion past the stitcher head. At the outlet end of the bag feeding mechanism, the bag holding members 98—102 are again opened by trip 108 to deliver the bag to the bag discharge mechanism.

Just after the bag is lifted by the bag lifting mechanism, hook 132 is brought into operation, being moved laterally across the front of the machine by the movement of reciprocating member 138 and then describing a wide arc due to oscillation of the shaft 143. This causes the string of the bag to be carried over the tag G and stitcher head as shown in Figs. 22 and 26 of the drawings. While these operations are being performed, a tag is also fed to the anvil of the stitcher head by the step by step movement of the spider 307.

As the bag holding members of the bag feeding means is opened by the trip 108, the bag passes to the bag discharge mechanism E. The bag is received on the bottom 247 of the bag discharge mechanism and is moved forwardly in front of the brushes 190 by the star wheels 230. The step by step movement of the bag discharge sprocket chains 187 delivers the bags to the outlet end of the machine. Movement of the bags along the bag discharge mechanism is caused by the lateral members 203 which are spaced from each other at desired distances indicated by arrows in Fig. 10 of the drawings to receive a desired number of bags between each two pair of said members. These members 203 are yieldingly mounted in their supports to permit them to give and the coil springs 208 function to force the bags of each group together and retain them in proper position.

Prior to the discharge of each tag from the bottom of the tube, disc 371 is rotated throughout a complete revolution so that the discharged tags will each have its hole 360 uniformly positioned as shown in Fig. 15 of the drawings. As the rod 361 is raised by engagement of cam 362 and roller 363, disc 371 first engages the curved end 297 of the rod 294 to move the finger 296 out of engagement with tags G and permit them to move downwardly in the tube. After the disc 371 passes the curved end 297 of rod 294, the finger 296 again engages the edge of the tags, but the bottom tag is beneath this finger and is therefore in position to be rotated by disc 371. When disc 371 is in raised position, it is rotated through a complete revolution. Regardless of the position of the hole 360 circumferentially of the tube, pin 372 enters this hole when it comes into alignment with it and carries the lower disc through the remainder of its revolution thereby positioning it for future operations.

Prior to the delivery of the tag from the tube, roller 363 rides upon the low portion of cam 362 permitting rod 361 to be lowered by spring 363' and remove the disc 371 from the bottom of the tube. The reciprocating tag feeding member shown in Fig. 5 of the drawings is brought into the tube by movement of the reciprocating member 308 toward the rear of the machine. It will be noted that the lower finger 309 is of rather substantial thickness, and this finger is arranged beneath the bottom tag, whereas finger 312, which enters between the bottom tag and the rest of the column, is relatively thin to facilitate its entrance between the two bottom tags. As the reciprocating member 308 moves toward the rear of the machine and as the finger 309, 312 enter the bottom of the tube, extension 318 rides on to the cam 322 carried by the other reciprocating member 321 to open the fingers. Just at the end of the rearward stroke of member 308, while the fingers are open, reciprocating member 321 moves toward the rear of the machine bringing the cam 322 from under the extension 318 and permitting fingers 309—312 to be closed by spring 316 and grasp a tag.

It will be noted from Fig. 15 of the drawings that the movement of the tag while grasped by the reciprocating tag feeding member is a straight line movement. When the member 308 reaches the forward end of its stroke, the can 319 on the opposite end of this member engages plate 323 carried by the other reciprocating member 321 to again open the fingers 309—312 to permit release of the tag. At the same time, one of the gripping members 340 is in position to grasp the tag and feed it through the step by step motion to the anvil. The jaws 341 and 342 of the gripping members of spider 307 are normally closed by a spring mounted on the pivot of the lower jaw 342. These jaws are adapted to be opened for the reception of a tag in the upper left-hand corner of the spider as shown in Fig. 15 and for the release of a tag at the anvil as shown in the lower right-hand corner of Fig. 15 by cam 343. When the reciprocating tag member and rod 308 are in forward position, engagement of the end of member 313 and the plate 347 swings the cam in a counter-clockwise direction in Fig. 11 of the drawings against the tension of spring 348. The tag holders between the anvil and the point of delivery of the tag have been retained in opened position by cam 343, but as the cam revolves in a counter-clockwise direction, it closes the jaws 341 and 342 of the tag holder in the upper left hand corner by causing this tag holder to ride off the end of the cam. The tag is then delivered with a step by step movement through four positions to the anvil. When the tag holder arrives at the anvil and rides up on the end of the cam, the jaws are opened to release the tag just as it is stitched to the string 24 of the bag. The notch 161 in the end of arm 160 engages the edge of the tag, and moves it from the position shown at the top and to the right in Fig. 15 to that shown at the bottom where the tag is on the anvil. This positions the tag for stitching it to the string at a point near the opening 360.

A supply of tags is maintained in the hopper 263, the tags being placed in the hopper by hand and being constantly agitated by the oscillation of the hopper. The tags are thus caused to feed into the top of the tube and form a stack or column. The member carried by the bail 277 shown in Fig. 28 of the drawings, facilitates feed of the tags as it continually pushes them toward the opening in the bottom of the hopper. The resilient support of the lower end 284 of this member prevents injury of the tags if they should jam in the bottom of the hopper.

I claim:

1. In combination with a wire stitching machine, bag delivery mechanism comprising a chute, means for urging bags toward the bottom of the chute, bag feeding mechanism adjacent the anvil of the stitching machine and above the bottom of the chute, and bag lifting means adapted to engage a single bag at the bottom of the chute and deliver it to the bag feeding mechanism.

2. In combination with a wire stitching machine, bag delivering means comprising a chute, bag feeding means adjacent to and above the lower end of the chute, lifting means to engage a single bag at the bottom of the chute and deliver it to the bag feeding means, tag feeding means to deliver tags to the anvil of the stitching machine, and bag discharge means adapted to receive the bags from said bag feed means.

3. In combination with a wire stitching machine, bag delivering means comprising a chute, means for urging the bags toward the bottom of said chute, bag feeding means adjacent to and above the lower end of said chute, lifting means to engage a single bag at the bottom of the chute and deliver it to the bag feeding mechanism, tag feeding means to deliver tags to the anvil of the stitching machine, and bag discharge means adapted to receive the bags from said bag feeding means.

4. In combination with a wire stitching machine, bag delivering means comprising a chute, means for urging the bags toward the bottom of said chute, bag feeding means adjacent to and above the lower end of said chute, lifting means to engage a single bag at the bottom of the chute and deliver it to the bag feeding means, means for imparting a step by step movement to the bag feeding means, tag feeding means for delivering a single tag to the anvil of the stitching machine, and discharge means to receive the bags from the bag feeding means.

5. In combination with a wire stitching machine, bag delivering means comprising a chute, means for urging the bags toward the bottom of said chute, bag feeding means, adjacent to and and above the lower end of said chute, lifting means to engage a single bag at the bottom of the chute and deliver it to the bag feeding means, means for imparting a step by step movement to the bag feeding means, tag feeding means for delivering a single tag to the anvil of the stitching machine, means for imparting a step by step motion to the tag feeding means, and discharge means associated with said bag feeding means.

6. In an apparatus of the character described, bag feeding means comprising a sprocket chain, bag holding means carried by said sprocket chain, said bag holding means comprising a stationary member and a pivoted member, means for normally retaining said bag holding means in closed position, and means for imparting a step by step motion to said bag feeding means.

7. In an apparatus of the character described, bag feeding means comprising a sprocket chain, bag holding means carried by said sprocket chain, said bag holding means comprising a stationary member and a pivoted member, means for normally retaining said bag holding means in closed position, tripping means arranged in the path of said pivoted member to open the bag holding means for the reception of and release of a bag, and means for imparting a step by step motion to said bag feeding means.

8. In an apparatus of the character described, a tag feeding mechanism comprising a tube adapted to receive the tags, a rotating member arranged adjacent the bottom of the tube, tag holders carried by said rotating member, a reciprocating device to receive tags singly from said tube and deliver them to said rotating member, said reciprocating device being provided with tag engaging jaws, and means for opening the jaws at the end of each stroke of the reciprocating member to receive the tags from the tubes and deliver them to the rotating member.

9. In an apparatus of the character described, a tag feeding mechanism comprising a tube adapted to receive the tags, a rotating member arranged adjacent the bottom of the tube, tag holders carried by said rotating member, a reciprocating device to receive tags singly from said tube and deliver them to said rotating member, said reciprocating device being provided with tag engaging jaws, and cams arranged in the path of the reciprocating device to open the jaws at the end of each stroke to receive a tag from the tube and deliver it to the rotating member.

10. In an apparatus of the character described, a tag feeding mechanism comprising a tube adapted to receive the tags, a rotating member arranged adjacent the bottom of the tube, tag holders carried by said rotating member, and a reciprocating device to remove a tag from the bottom of the tube and deliver it to the rotatable member, said reciprocating device comprising a rigid member and a pivoted member.

11. In an apparatus of the character described, a tag feeding mechanism comprising a tube adapted to receive the tags, a rotating member arranged adjacent the bottom of the tube, tag holders carried by said rotating member, a reciprocating device to remove a tag from the bottom of the tube and deliver it to the rotatable member, said reciprocating device comprising a rigid member and a pivoted member, and means for opening said members for the reception of and delivery of a tag.

12. In an apparatus of the character described, tag feeding mechanism comprising a tube in which the tags are arranged, means for delivering a single tag from the bottom of said tube, and means for positioning the tags circumferentially of the tube, said means comprising a disc having a pin adapted to be received in a hole in the tag, and means for rotating said disc one revolution prior to the delivery of each tag.

13. In an apparatus of the character described, a tag feeding mechanism comprising a tube adapted to receive the tags, a hopper arranged on the top of said tube, and means for moving said hopper in a substantially circular path over the upper end of the tube.

14. In an apparatus of the character described, bag feeding means comprising a sprocket chain, a plurality of bag holders mounted on said chain, each bag holder comprising a plate, an arm mounted on said plate, a second arm pivoted to said plate and a spring on said pivoted arm to normally retain said arms in closed position, and means for imparting a step by step movement thereto.

15. In an apparatus of the character described, bag feeding means comprising a sprocket chain, a plurality of bag holders mounted on said chain, each bag holder comprising a plate, an arm mounted on said plate, a second arm pivoted to said plate, a spring on said pivoted arm to normally retain said arms in closed position and a laterally connected pin carried by said arm, and means for imparting a step by step movement thereto.

16. In an apparatus of the character described, tag feeding mechanism comprising a tube adapted to receive a column of tags, and means for delivering a single tag from said tube, said means comprising a reciprocating member, a finger rigidly mounted on said member, a second finger pivotally mounted on said member and cooperating with said first finger to form a tag engaging means, means for normally retaining said fingers in closed position, and means for opening said fingers at the end of each stroke of said reciprocating member for reception of and delivery of a tag.

17. In an apparatus of the character described, tag feeding mechanism comprising a tube adapted to receive a column of tags, and means for delivering a single tag from said tube, said means comprising a reciprocating member, a finger rigidly mounted on said member, a second finger pivotally mounted on said member and cooperating with said first finger to form a tag engaging means, a spring for normally retaining said fingers in closed position, and means for opening said fingers at the end of each stroke of said reciprocating member for the reception of and delivery of a tag.

18. In an apparatus of the character described, tag feeding mechanism comprising a tube adapted to receive a column of tags, and means for delivering a single tag from said tube, said means comprising a reciprocating member, a finger rigidly mounted on said member, a second finger pivotally mounted on said member and cooperating with said first finger to form a tag engaging means, means for normally retaining said fingers in closed position, and cams arranged in the path of said reciprocating member to open said fingers for the reception of and release of a tag.

19. In an apparatus of the character described, tag feeding mechanism comprising a tube having an inner diameter substantially equal to the diameter of the tags, a hopper arranged over said tube and having an opening larger than the diameter of said tube, and means for moving said hopper in a substantially circular path over the upper end of the tube.

20. In an apparatus of the character described, tag feeding mechanism comprising a tube having an inner diameter substantially equal to the diameter of the tags, a hopper arranged over said tube and having an opening larger than the diameter of said tube, means for moving said hopper in a substantially circular path over the upper end of the tube, and a yieldable device mounted in said hopper for forcing the tags toward said hopper opening.

21. In an apparatus of the character described, bag discharge mechanism comprising a base, a pair of horizontal sprocket chains arranged on each side of said base, and spaced members carried by said sprocket chain and projecting toward each other to form pockets for the reception of the bags, said members being yieldingly mounted.

22. In an apparatus of the character described, bag discharge mechanism comprising a base, a pair of horizontal sprocket chains arranged on each side of said base, and a plurality of spaced members hinged to said sprocket chain and projecting toward each other to form pockets for the reception of the bags, said hinged members being yieldingly mounted.

23. In a bag discharge mechanism, star wheels mounted adjacent the inlet end thereof to feed the bags into the bag discharge mechanism, and means for imparting a step by step motion to said star wheels.

24. In a device of the character described, a bag lifting device comprising a pair of pivotally mounted arms, pins mounted in said arms to engage a bag to be lifted, means for urging the arms toward the bag to be lifted, and means for reciprocating said arms.

25. In a device of the character described, a bag lifting device comprising a pair of pivotally mounted arms, pins mounted in said arms to engage a bag to be lifted, springs for urging the arms toward the bag to be lifted, a stop to limit the movement of said arms, and means for reciprocating said arms.

26. In an apparatus of the character described, a bag lifting device comprising a pair of reciprocating arms, pins in said arms to engage the bag to be lifted, and a reciprocating combing device adapted to engage the bag beneath said bag lifting device to exert a downward pull on the bag and cause said pins to enter the material of the bag.

27. In an apparatus of the character described, tag delivery means comprising a tube, means for delivering a tag from said tube comprising a reciprocating member, a pair of normally closed fingers carried by said member and adapted to engage a tag when the member is reciprocated in one direction, a second reciprocating member arranged adjacent said first reciprocating member, and cooperating means carried by said reciprocating members to open said fingers at each end of the stroke of the first reciprocating member for the reception of and release of a tag.

28. In combination with a wire stitching machine, bag delivery mechanism comprising a chute, means for urging bags toward the bottom of the chute, bag feeding means adjacent to and above the lower end of said chute, and lifting means to engage a single bag at the bottom of the chute and deliver it to said bag feeding means.

29. In an apparatus of the character described, bag feeding means comprising a sprocket chain, bag holding means carried by said sprocket chain, said bag holding means comprising a stationary member and a pivoted member, means for normally retaining said bag holding means in closed position, tripping means arranged in the path of said pivoted member at the beginning of the lower flight of said sprocket chain to open said bag holding means for the reception of a bag, means for delivering a bag to said bag holding means, tripping means at the end of the lower flight of said sprocket chain to open said holding members for the discharge of a bag, and discharge means to receive bags from the bag feeding means.

30. In an apparatus of the character described, tag feeding mechanism comprising a tube in which the tags are arranged, means for delivering a single tag from the bottom of said tube, and means for positioning the tags circumferentially of the tube, said means comprising a disc having a pin adapted to be received in a hole in the tag, means for rotating said disc one revolution prior to the delivery of each tag, means for raising the disc to an operative position prior to its revolution, and means for returning the disc to an inoperative position at the conclusion of its revolution.

31. In an apparatus of the character described, a tag feeding mechanism comprising a tube adapted to contain the tags to be delivered, a rotating member arranged adjacent the bottom of said tube, tag holders carried by said rotating member, a reciprocating device comprising a stationary member and a pivoted member to remove a tag from the bottom of said tube and deliver it to the rotatable member, a second reciprocating member arranged adjacent said first reciprocating member, and cams carried by said second reciprocating member to open said stationary and pivoted members for the reception of and release of a tag.

32. In a device of the character described, tag feeding mechanism comprising a tube for the reception of the tags to be delivered, a rotating member comprising a spider, tag holders forming the arms of said spider, each of said tag holders comprising a stationary member and a pivoted member, means for delivering a tag from said tube to one of said tag holders, said means comprising a reciprocating member, a finger rigidly mounted on said reciprocating member, a second finger pivotally mounted on said reciprocating member and forming, with said first finger, the tag holding means, means for normally retaining said fingers in closed position, and means controlled by the reciprocation of said reciprocating member for opening said fingers for the reception of and release of a tag.

33. In a device of the character described, tag feeding mechanism comprising a tube for the reception of the tags to be delivered, a rotating member comprising a spider, tag holders forming the arms of said spider, each of said tag holders comprising a stationary member and a pivoted member, means for delivering a tag from said tube to one of said tag holders, said means comprising a reciprocating member, a finger rigidly mounted on said reciprocating member, a second finger pivotally mounted on said reciprocating member and forming, with said first finger, the tag holding means, means for normally retaining said fingers in closed position, and cams arranged in the path of said reciprocating member to open said fingers for the reception of and release of a tag.

34. In combination with a wire stitching machine, means for feeding bags to said machine, a hook to engage a string of the bag and carry it over the anvil of the stitching machine, and means reciprocating and oscillating said hook.

35. In combination with a wire stitching machine, means for feeding bags to said machine, a reciprocating member arranged near the anvil of the stitching machine, a hook adapted to engage a string of a bag carried by said reciprocating member, and means for oscillating said hook.

36. In combination with a wire stitching machine, means for feeding bags to said machine, a reciprocating member arranged adjacent the anvil of said machine, an arm pivoted on the reciprocating member, a hook carried by said arm, and means for oscillating the arm and the hook.

37. In combination with a wire stitching machine, means for feeding bags to said machine, a reciprocating member arranged adjacent the anvil of said machine, an arm pivoted on the reciprocating member, a hook carried by the arm, and an oscillating shaft carried by the reciprocating member and connected to said arm.

JOHN THOMAS DALTON.

CERTIFICATE OF CORRECTION.

Patent No. 2,207,912.　　　　　　　　　　　　　　July 16, 1940.

JOHN THOMAS DALTON.

It is hereby certified that error appears in the printed specification of the above numbered patent requiring correction as follows: Page 5, first column, line 22, for "spring 215" read --spring 216--; same page, second column, line 16, beginning with "The plate" strike out all to and including the word and period "actuated." in line 25; page 8, first column, line 45, for "can" read --cam--; page 9, first column, line 33, claim 9, for "machanism" read --mechanism--; and second column, line 34, claim 16, before "reception" insert --the--; and that the said Letters Patent should be read with this correction therein that the same may conform to the record of the case in the Patent Office.

Signed and sealed this 3rd day of September, A. D. 1940.

(Seal)　　　　　　　　　　　　　　　　　　　　　　　Henry Van Arsdale,
　　　　　　　　　　　　　　　　　　　　　　Acting Commissioner of Patents.